S. P. MICHAEL.
TIRE RIM.
APPLICATION FILED JAN. 15, 1916.
1,235,360.
Patented July 31, 1917.
2 SHEETS—SHEET 1.
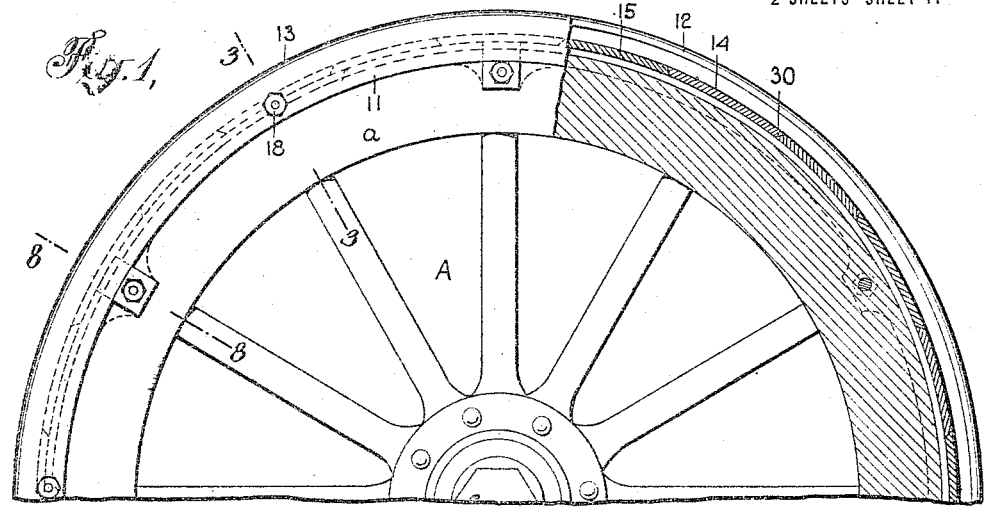
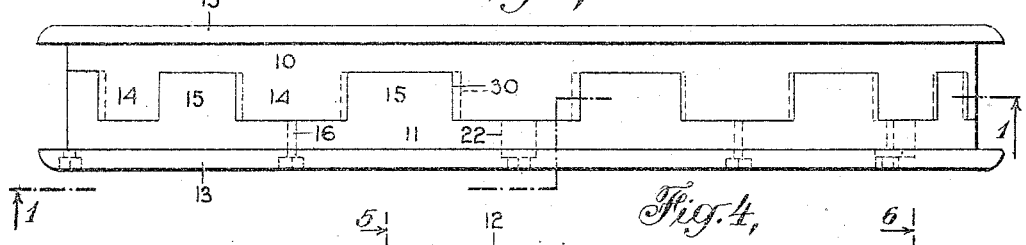
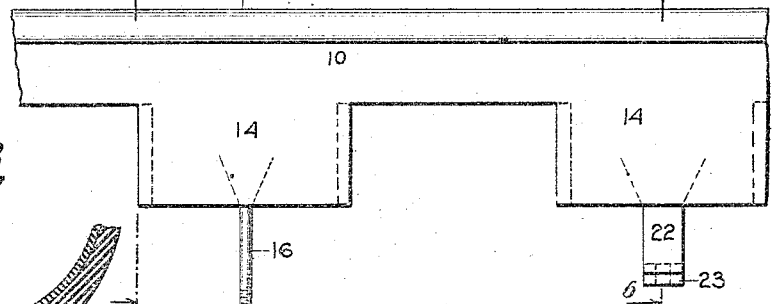
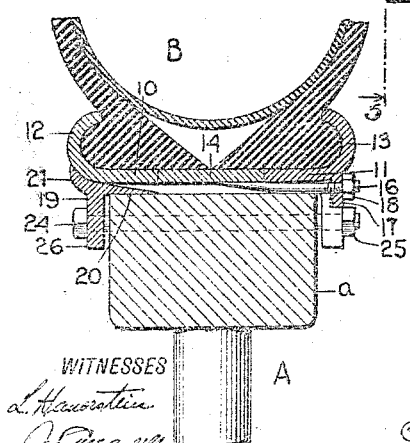
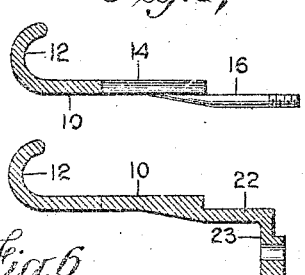
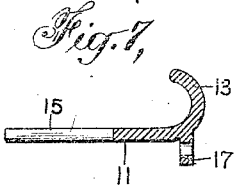
INVENTOR
S. P. Michael
ATTORNEYS

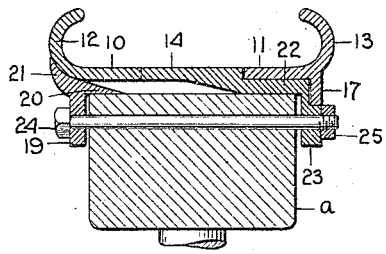
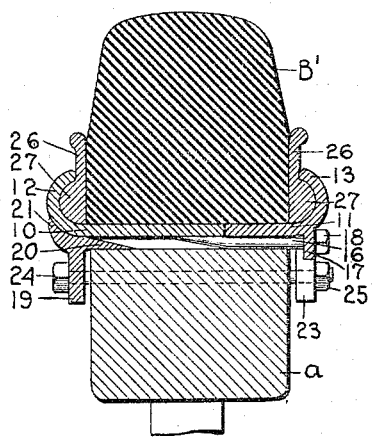
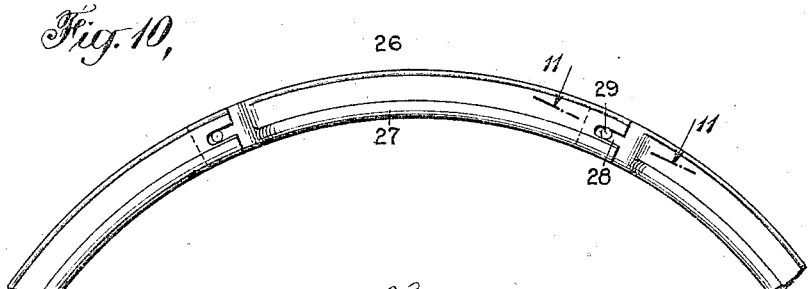
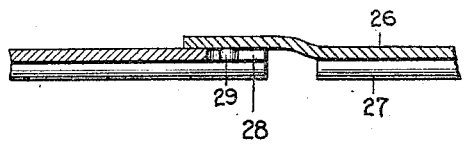

UNITED STATES PATENT OFFICE.

SAMUEL PEARL MICHAEL, OF FRANKFORT, INDIANA, ASSIGNOR OF FIFTY-ONE ONE-HUNDREDTHS TO PATRICK A. RICE, OF FRANKFORT, INDIANA.

TIRE-RIM.

1,235,360.　　　　Specification of Letters Patent.　　Patented July 31, 1917.

Application filed January 15, 1916. Serial No. 72,245.

*To all whom it may concern:*

Be it known that I, SAMUEL P. MICHAEL, a citizen of the United States, and a resident of Frankfort, in the county of Clinton and State of Indiana, have invented a new and Improved Tire-Rim, of which the following is a full, clear, and exact description.

My invention relates to a rim adapted to constitute a demountable rim, and including as a part thereof a quick detaching tire-holding element, whereby to detach the tire without demounting the rim as a whole or disturbing the parts of the rim other than the detachable tire element.

Objects of the invention are to provide a rim having the mentioned characteristics and so constructed and arranged that the attaching or detaching of the tire, or the mounting or demounting of the rim, may be effected without the use of extra wrenches, without hammering, and with the minimum expenditure of time and work.

Other objects of the invention are to effect the secure holding of the rim and tire and promote simplicity of construction with the maximum strength and durability.

The invention will be particularly explained in the specific description following.

Reference is to be had to the accompanying drawings forming a part of this specification in which similar reference characters indicate corresponding parts in all the views.

Figure 1 is a side elevation of a portion of a wheel equipped with my improved rim, the view being partly in section on the line 1—1, Fig. 2;

Fig. 3 is a plan view of the rim;

Fig. 3 is a cross section on the line 3—3, Fig. 1;

Fig. 4 is a fragmentary plan view on an enlarged scale, of a portion of one of the sections of my improved rim;

Fig. 5 is a cross section on the line 5—5, Fig. 4;

Fig. 6 is a cross section on the line 6—6, Fig. 4;

Fig. 7 is a cross sectional view of the rim section coacting with the rim section shown in Figs. 4 to 6;

Fig. 8 is a cross section on the line 8—8, Fig. 1;

Fig. 9 is a cross section similar to Fig. 3 but showing auxiliary tire-holding elements to be employed in the case of a flat-sided tire;

Fig. 10 is a side view of a portion of one of the said auxiliary elements entering into the arrangement illustrated in Fig. 9; and Fig. 11 is an enlarged transverse section on the line 11—11, Fig. 10.

My improved rim is formed of separate side sections, 10, 11, having, respectively, annular tire-engaging members, 12, 13, which, generally, will be clencher members.

The opposed edges of the respective sections interlock by means of alternate projections and recesses, there being lateral projections 14 on the one section and mating projections 15 on the opposed edge of the opposite section, the projections on one section being receivable in the recesses of the other.

The respective rim sections, 10, 11, have co-acting fastening elements so that one rim section will constitute a quick detaching tire element for quickly removing a tire without disturbing the rim as a whole. For the mentioned purpose the section 10 is provided on certain of the projections 14 thereof with bolt extensions 16 of a length to extend through the clamp flange 17 on the opposed section 11, the connection being completed by a nut 18. The tightening up of a nut draws the clencher elements, 12, 13, toward each other to securely retain a tire B in position.

At the inner side of the rim, a known form of clamp ring 19, or other approved detachable rim clamping means is employed to engage the rim at that side. The form of clamp ring illustrated is provided with an inwardly disposed annular wedge flange 20 to enter beneath the rim, between the same and the felly A, and also, said ring 19 is formed with a curved flange 21 to engage the rim section 10. At the opposite side of the rim there is formed on the said rim section 10 lateral extensions 22, having lugs 23 extending radially inward of said extensions. It will be observed that the lugs 23 are disposed at the same side of the rim as the bolts 16 and the co-acting clamp flange 17 of the detachable rim section 11. A series of transverse bolts 24 extend through the felly A, through the lugs 23, and through lugs 26 on the ring 19 at the opposite side of the felly, nuts 25 serving to complete the clamping of the rim to the felly. It will be seen that the bolts 24 thus serve to demountably secure the rim to the felly independently of the bolts 16 that connect the rim sections 10, 11, with each other. In practice, therefore, by merely loosening the nuts 18, the rim section 11 may be quickly detached to remove the tire B, whereas the removal of the bolts 24 will permit the complete rim for the tire, carried thereby, to be quickly demounted from the felly.

The bolts 16, it is to be noted, are offset to pass beneath the rim section 11 as are also, the extensions 22, so that the said removable section 11 fits over, that is to say radially outward from the offset bolts 16 and the offset extensions 22. It is to be noted also, that the described construction permits of the nuts 25 and 18 being located at the same side of the wheel, that is to say, at the outside and that the same wrench may be employed to tighten or remove the nuts, the unscrewing of a few nuts being all that is necessary to permit the detachment of the rim section 11 and the removal of the nuts 25 and bolts 24 alone being required to remove the rim as a whole.

In order to enable my improved rim to be employed with a flat-sided tire in case of necessity, I provide, as shown in Fig. 9, additional annular elements 26 having flat inner sides and having beads 27 on the outer sides rounding in cross section to conform to the concavity of the clencher members, 12, 13. The elements 26 are made up in detachable segments, having a slot and pin connection at their ends, there being a slot 28 on one end of a section and a pin 29, on the other end. The construction permits the elements 26 to be folded into small compass to be carried in the tool box to be used in case of emergency.

The side edges of the projections, 14, 15, are reversely beveled as indicated at 30, Figs. 1 and 2, whereby to lend transverse flexibility to the rim and relieve strain at the side edges thereof, the said beveling also preventing buckling of the rim.

I would mention that my improved rim is adaptable for use with a solid tire, thereby making the rim suitable for use on trucks, as extra tires can be readily carried as with others having ordinary rims.

Having thus described my invention I claim as new and desire to secure by Letters Patent:

1. A tire holding rim for vehicle wheels, comprising two annular sections of substantially the same diameter and having abutting edges, members on one section extending from the abutting edge thereof under the other section and having inwardly projecting apertured extremities, and means for securing the sections together.

2. A tire rim composed of annular side sections formed at the outer sides thereof with annular tire-holding members, the opposed edges of the said sections having mating lateral tongues and recesses, the transverse edges of said tongues and recesses being dove-tailed, and means to detachably connect the sections.

3. A tire-holding rim for vehicle wheels comprising two annular sections of substantially the same diameter and having abutting edges, the members on one section extending from the abutting edge thereof under the other section and having inwardly projecting apertured extremities, additional members on the same section carrying the first-mentioned members, and inwardly extending members on the other section engaged with the second-mentioned members.

In testimony whereof I have signed my name to this specification in the presence of two subscribing witnesses.

SAMUEL PEARL MICHAEL.

Witnesses:
R. F. FOWLER,
M. E. KOFFEL.